(12) United States Patent
Thomson et al.

(10) Patent No.: US 9,969,639 B2
(45) Date of Patent: May 15, 2018

(54) ANAEROBIC SUSPENDED GROWTH TREATMENT OF CONTAMINATED WATER

(71) Applicants: Bruce Merrill Thomson, Albuquerque, NM (US); Jean-Claude Yacoub Younan, Columbia, SC (US); Joseph D. Chwirka, Sandia Park, NM (US)

(72) Inventors: Bruce Merrill Thomson, Albuquerque, NM (US); Jean-Claude Yacoub Younan, Columbia, SC (US); Joseph D. Chwirka, Sandia Park, NM (US)

(*) Notice: Subject to any disclaimer, the term of this patent is extended or adjusted under 35 U.S.C. 154(b) by 0 days. days.

(21) Appl. No.: 14/558,907

(22) Filed: Dec. 3, 2014

(65) Prior Publication Data
US 2015/0083662 A1 Mar. 26, 2015

Related U.S. Application Data

(63) Continuation-in-part of application No. 14/054,496, filed on Oct. 15, 2013.
(Continued)

(51) Int. Cl.
*C02F 9/00* (2006.01)
*C02F 3/28* (2006.01)
(Continued)

(52) U.S. Cl.
CPC ............ *C02F 9/00* (2013.01); *C02F 3/006* (2013.01); *C02F 3/2826* (2013.01);
(Continued)

(58) Field of Classification Search
USPC ................................. 210/196, 688
See application file for complete search history.

(56) References Cited

U.S. PATENT DOCUMENTS 4,405,464 A 9/1983 Baldwin et al.
5,076,927 A 12/1991 Hunter
(Continued)

FOREIGN PATENT DOCUMENTS

EP 0755730 A1 1/1997
EP 2436655 A2 4/2012

OTHER PUBLICATIONS

Lloyd, J., Microbial reduction of metals and radionuclides, FEMS Microbiology Review, 2003, vol. 27, issue 2-3, pp. 411-425.
(Continued)

*Primary Examiner* — Claire A Norris
(74) *Attorney, Agent, or Firm* — Gonzales Patent Services; Ellen M. Gonzales

(57) ABSTRACT

A system may include a reactor, in which an anaerobic environment exists, that includes a slurry of at least contaminated water and a mixed bacterial culture of facultative bacteria and anaerobic bacteria. The mixed bacterial culture may be suspended within the slurry. The contaminated water may include contaminants associated with a non-metal, a metal, or a metalloid. The mixed bacterial culture may react with the contaminated water to reduce or remove the contaminants from the contaminated water to create a treated slurry. The reactor may output the treated slurry. The system may also include a filtration device to receive the treated slurry; remove, from the treated slurry, the mixed bacterial culture and the contaminants, reduced or removed from the contaminated water, to create treated water; and output the treated water. The system may also include an aeration device to add dissolved oxygen to the treated water, and output the treated water. The system may also include a reaction device where iron or aluminum salts are added to remove phosphorous, selenite, arsenate, or other contaminants which adsorb onto iron or aluminum oxyhydroxide solids. The system may also include a filtration device to
(Continued)

remove the solids from the water, and output the treated water.

15 Claims, 8 Drawing Sheets

Related U.S. Application Data

(60) Provisional application No. 61/712,865, filed on Oct. 12, 2012.

(51) Int. Cl.
| | |
|---|---|
| *C02F 3/34* | (2006.01) |
| *C02F 3/00* | (2006.01) |
| C02F 1/52 | (2006.01) |
| C02F 1/00 | (2006.01) |
| C02F 101/20 | (2006.01) |
| C02F 101/00 | (2006.01) |
| C02F 101/10 | (2006.01) |
| C02F 101/12 | (2006.01) |
| C02F 101/16 | (2006.01) |
| C02F 101/22 | (2006.01) |
| C02F 103/10 | (2006.01) |
| C02F 103/18 | (2006.01) |

(52) U.S. Cl.
CPC ............ *C02F 3/2853* (2013.01); *C02F 3/341* (2013.01); *C02F 1/004* (2013.01); *C02F 1/5245* (2013.01); *C02F 3/286* (2013.01); *C02F 2101/006* (2013.01); *C02F 2101/103* (2013.01); *C02F 2101/106* (2013.01); *C02F 2101/12* (2013.01); *C02F 2101/163* (2013.01); *C02F 2101/20* (2013.01); *C02F 2101/203* (2013.01); *C02F 2101/206* (2013.01); *C02F 2101/22* (2013.01); *C02F 2103/10* (2013.01); *C02F 2103/18* (2013.01); *C02F 2203/002* (2013.01); *C02F 2209/001* (2013.01); *C02F 2209/003* (2013.01); *C02F 2209/04* (2013.01); *C02F 2209/06* (2013.01); *C02F 2209/40* (2013.01); *C02F 2209/44* (2013.01); *C02F 2305/06* (2013.01); *Y02A 20/156* (2018.01); *Y02W 10/15* (2015.05); *Y02W 10/37* (2015.05)

(56) References Cited

U.S. PATENT DOCUMENTS

| | | | |
|---|---|---|---|
| 5,993,667 A | 11/1999 | Overman | |
| 6,015,496 A * | 1/2000 | Khudenko | C02F 3/006 210/603 |
| 6,033,572 A | 3/2000 | Yano et al. | |
| 6,183,644 B1 | 2/2001 | Adams et al. | |
| 6,946,073 B2 * | 9/2005 | Daigger et al. | 210/605 |
| 7,147,779 B1 | 12/2006 | Phifer | |
| 7,387,723 B2 | 6/2008 | Jordan | |
| 7,550,087 B2 | 6/2009 | Peeters et al. | |
| 8,163,181 B2 | 4/2012 | Peeters et al. | |
| 8,173,019 B2 | 5/2012 | Zhimin et al. | |
| 8,404,111 B2 | 3/2013 | Bae et al. | |
| 8,557,118 B2 | 10/2013 | Kain et al. | |
| 8,758,614 B2 | 6/2014 | Ewing | |
| 2003/0062306 A1* | 4/2003 | Perriello | B09C 1/002 210/611 |
| 2006/0000768 A1* | 1/2006 | Miklos | C02F 3/006 210/605 |
| 2006/0163154 A1* | 7/2006 | Tay | B09C 1/002 210/605 |
| 2006/0201876 A1* | 9/2006 | Jordan | 210/609 |
| 2011/0174743 A1* | 7/2011 | Huang | 210/758 |
| 2012/0024798 A1 | 2/2012 | Picket et al. | |
| 2012/0152761 A1 | 6/2012 | Picket et al. | |
| 2014/0209526 A1 | 7/2014 | Picket et al. | |
| 2014/0263043 A1 | 9/2014 | Mehta et al. | |

OTHER PUBLICATIONS

Barton, L.L. et al, Reduction of Metals and Nonessential Elements by Anaerobes, Biochemistry and Physiology of Anaerobic Bacteria, Springer-Verlag, New York, NY, 2003, pp. 220-234.

Christian et al., The First Two Years of Full-Scale Anaerobic Membrane Bioreactor (AnMBR) Operation Treating High-Strength Industrial Wastewater, 2011, Water Practice & Technology vol. 6 No. 2.

Grant, S, et al., "Full-Scale Applications of the Anaerobic Membrane Bioreactor Process for Treatment of Stillage from Alcohol Production in Japan" Proceedings of the Water Environment Federation, WEFTEC 2008: Session 101 through Session 115, pp. 7556-7570(15).

Allison, M., et al. "Full-Scale Operating Experience with USA-based ADI-AnMBR Systems for Food Wastes" Proceedings of the Water Environment Federation, WEFTEC 2013: Session 70 through Session 79, pp. 5255-5270 (16).

Vernon, Rene E. "Which Elements Are Metalloids?"| J. Chem. Educ. 2013, 90, 1703-1707.

ADI Anaerobic Membrane Bioreactor marketing material.
ADI Systems Brochure.

* cited by examiner

ANAEROBIC SUSPENDED GROWTH TREATMENT OF CONTAMINATED WATER

REFERENCE TO RELATED APPLICATION

The present application is a Continuation-in-Part of U.S. patent application Ser. No. 14/054,496, filed Oct. 15, 2013, which claims priority to U.S. Provisional Patent Application No. 61/712,865, filed Oct. 12, 2012, both of which are hereby incorporated by reference.

BACKGROUND

Many natural waters and industrial contaminated waters have elevated concentrations of metals, metalloids, and other contaminants that may present threats to human health and the environment. For example, flue gas desulphurization (FGD) contaminated water, a byproduct of a process to remove sulfur dioxide from exhaust gases from coal fired power plant operations, usually includes high concentrations of contaminants, such as arsenic (As), mercury (Hg), selenium (Se), perchlorate ($ClO_4^-$), and nitrate ($NO_3$—N) which must be removed prior to being discharged back into the environment and/or water supply. Agricultural drainage may also contain high concentrations of Se, $NO_3$, As, and other contaminants. Drainage from surface and underground mining operations, including coal mines, non-ferrous metal mines and iron ore mines may also be acidic or basic, and/or may include high concentrations of metals and/or metalloids including As, antimony (Sb), barium (Ba), beryllium (Be), cadmium (Cd), chromium (Cr), cobalt (Co), copper (Cu), iron (Fe), lead (Pb), manganese (Mn), Hg, nickel (Ni), (Se), technetium (Tc), Thallium (Tl) uranium (U), vanadium (V), and/or zinc (Zn).

In addition to the metals, metalloids, and nitrates listed above, contaminated waters from these and other industrial operations frequently contain high concentrations of total dissolved solids (TDS), non-regulated cations such as sodium (Na), potassium (K), calcium (Ca), magnesium (Mg), and non-regulated anions, such as chlorides (Cl), bicarbonates and carbonates ($HCO_3^-/CO_3^{2-}$), perchlorates ($ClO_4^-$), sulfates ($SO_4^{2-}$), and silica ($SiO_2$). The presence of high TDS and non-regulated constituents makes removal of the regulated constituents very difficult.

Today's methods of treating contaminated water contaminated with metals, metalloids, and other contaminants rely heavily on physical and chemical processes. Chemical precipitation can be used to remove many metals but is generally not effective for removing metalloids (e.g., As and/or Se) and/or metals that form oxyanions, such as, for example, chromate (e.g., $CrO_4^{2-}$), molybdate (e.g., $MoO_4^-$), or uranyl dicarbonate (e.g., $UO_2(CO_3)_2^{2-}$).

Current methods based on adsorption onto iron oxides can remove some metalloids (e.g., As) but not others (e.g., Se) from contaminated water. Ion exchange can remove most metals, metalloids and/or other contaminants, but selective removal of such metals, metalloids, and/or contaminants is not effective for treating contaminated waters with very high TDS concentrations. Membrane processes such as reverse osmosis (RO) or electrodialysis reversal (EDR) are desalination processes that will remove all dissolved constituents but are expensive and difficult to operate, remove virtually all dissolved constituents resulting in production of large volumes of waste that are difficult to manage, and/or recover only a fraction of the feed water thereby resulting in a large loss of water which may be valuable. Other than desalination methods, there is no technology which can simultaneously remove all of the regulated metals and metalloids in a single process.

Known biologically-based technologies for treating water are based on growth of microorganisms that are attached as a biofilm grown to a solid surface (hereinafter sometimes referred to "solid substrate"), such as particles of sand, granular activated carbon (GAC), plastic beads or sheets (hereinafter, "attached growth technology," "conventional reactor," and/or "substrate based technology"). For example, one such attached growth technology includes attached growth organisms that are grown on GAC in a column configuration in which metals, metalloids, and/or other contaminants (e.g., nitrates, sulfates, etc.) are reduced by a population of anaerobic bacteria (hereinafter referred to as "anaerobes" or "anaerobic bacteria") that attach to the surface to form a bacterial layer (sometimes referred to as a "slime layer"). The anaerobic bacteria can reduce the dissolved metals, metalloids, and/or other contaminants within the contaminated water with subsequent formation of a precipitate, which can be removed by filtration. Another attached growth technology includes an up-flow fluidized bed reactor in which a film of anaerobic bacteria attached to the surface of a granular media reduce the metal, metalloids, and/or other contaminants within the water to form a precipitate.

Unfortunately, the bacterial layer that is formed in attached growth technologies is fragile and can sometimes be destroyed, reduced, or damaged by processes such as abrasion or toxic constituents. Additionally, the bacterial population that is attached to the physical substrate may be associated with long and/or multi-stage treatment cycles and/or large volumes of support media (e.g., tanks, agitators, plumbing, etc.) to maximize the surface area of the physical substrates. Finally, it is difficult to maintain a concentration of bacteria, associated with an attached growth technology, to ensure that a biological reaction rate, of the bacterial layer, is sustained and/or long detention times for removal of metals, metalloids and other non-metal contaminants are avoided.

SUMMARY

According to one possible implementation, a treatment system, to treat contaminated water, may include a reactor, in which an anaerobic environment exists, that includes a slurry of contaminated water, organic material, and a mixed bacterial culture that includes facultative bacteria and anaerobic bacteria. The mixed bacterial culture may be suspended within the slurry and not attached to a solid substrate associated with attached growth technology. The contaminated water may include contaminants associated with at least one of a non-metal, a metal, or a metalloid. The organic material may act as an electron donor for the mixed bacterial culture that enables the mixed bacterial culture to react with the contaminated water to reduce or remove the contaminants from the contaminated water. The reactor may output, as a treated slurry, the organic material, the mixed bacterial culture, and the contaminated water from which the contaminants have been reduced or removed. The treatment system may also include a filtration device to receive the treated slurry; remove, from the treated slurry, the organic material and the mixed bacterial culture; and output, as treated water, the contaminated water from which the contaminants have been reduced or removed.

According to another possible implementation a device, to treat contaminated water, may include a vessel that includes a slurry of contaminated water, organic material and a mixed bacterial culture, that includes facultative bacteria and anaerobic bacteria, within an anaerobic environment. The mixed bacterial culture may be suspended within the slurry. The contaminated water may include contaminants associated with at least one of a non-metal, a metal, or a metalloid. The organic material may act as an electron donor for the mixed bacterial culture that enables the mixed bacterial culture to react with the contaminated water to reduce or remove the contaminants from the contaminated water. Reducing or removing the contaminants, from the contaminated water, may enable treated water to be obtained.

According to a further possible implementation, a treatment system, to treat contaminated water, may include one or more reactors, in which a respective anaerobic environment exists in each of the one or more reactors that includes a slurry of at least contaminated water and a mixed bacterial culture that includes facultative bacteria and anaerobic bacteria. The mixed bacterial culture may be suspended within the slurry. The contaminated water may include contaminants associated with at least one of a non-metal, a metal, or a metalloid. The mixed bacterial culture may react with the contaminated water to reduce or remove the contaminants from the contaminated water to create treated slurry. The one or more reactors may output the treated slurry. One of the anaerobic reactors may be considered a maturation reactor where no carbon source is added causing excess carbon source to be utilized by the facultative or anaerobic bacteria and not output with the treated water as excess chemical oxygen demand or biological oxygen demand. The treatment system may also include one or more filtration devices to: receive the treated slurry; remove, from the treated slurry, the mixed bacterial culture and the solid phase contaminants, reduced or removed from the contaminated water; create treated water; and output the treated water. The treatment system may also include an aeration basin or forced aeration device following the filtration device to add dissolved oxygen back into the treated water following anoxic/anaerobic treatment and output the treated water. The treatment system may also include a reaction basin where an iron or aluminum salt, such as ferric chloride, is mixed with the treated water to adsorb the remaining phosphorous or selenite following the anoxic/anaerobic treatment processes and a filtration stage to remove the solids generated in the reaction basin, and output the treated water.

DETAILED DESCRIPTION

Figure 1A:
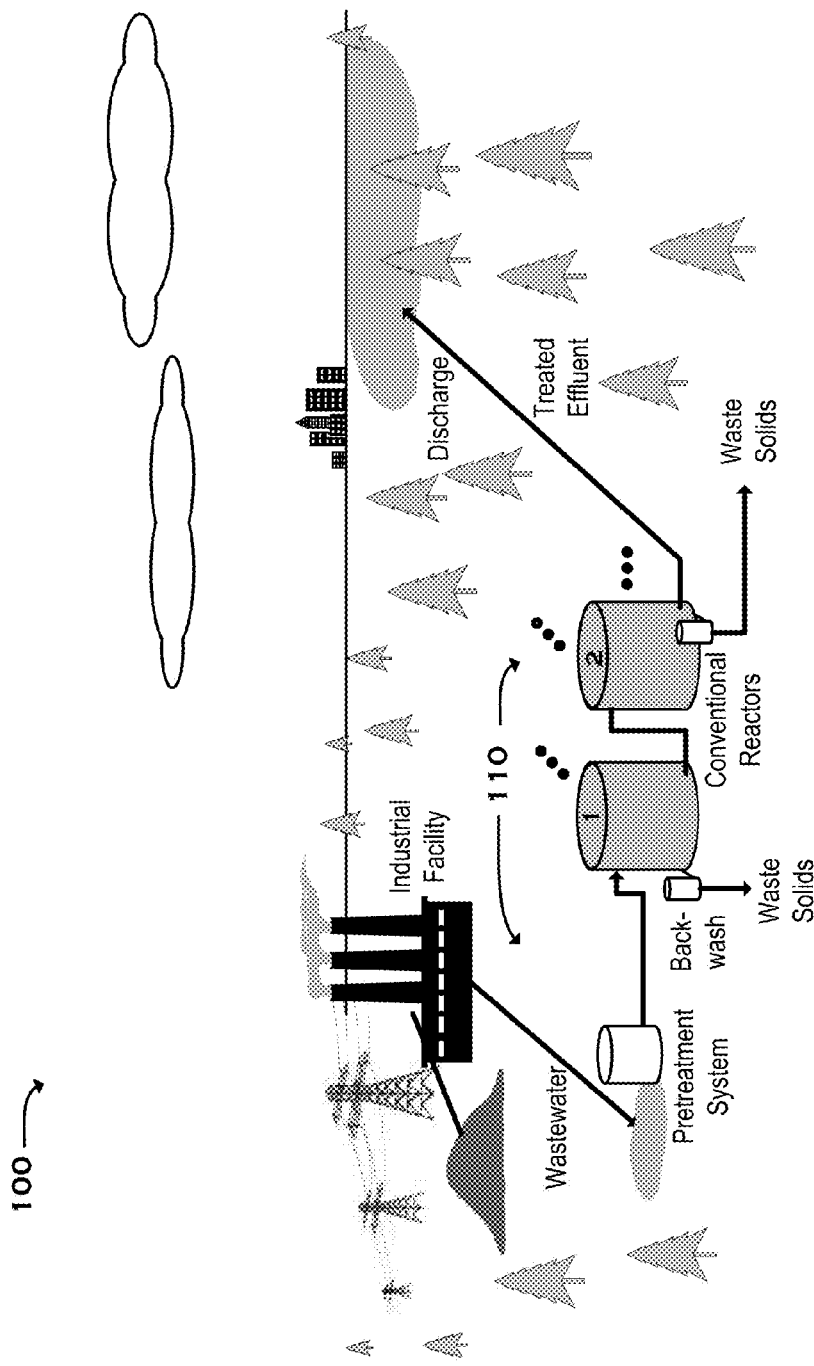
FIG. 1A: is a diagram of an example environment in which a conventional anaerobic water treatment system operates to treat contaminated water.

According to various embodiments, the systems and/or methods, described herein enable water, contaminated with one or more metals (hereinafter, "contaminated water"), metalloids or non-metallic matter, to be treated using an anaerobic suspended growth water treatment system to chemically reduce (hereinafter referred to as "reduce") and/or to remove the metals, metalloids, and/or non-metallic matter from the contaminated water. The term "contaminated water" may correspond to aqueous fluids commonly referred to as natural water (e.g., in lakes, rivers, ponds, runoff, reservoirs, aquifers, etc.) or aqueous fluids discharged from an industrial operation (e.g., from mining operations, power generation operations, manufacturing operations, chemical production operations, drilling operations, etc.) that includes one or more contaminants. The contaminants may include one or more metals (e.g., chromium (Cr), copper (Cu), mercury (Hg), molybdenum (Mo), nickel (Ni), lead (Pb), technetium (Tc), tellurium (Tl), vanadium (V), and/or zinc (Zn)), metalloids (e.g., antimony (Sb), arsenic (As) and selenium (Se)), and/or non-metallic matter (e.g., dissolved oxygen (DO), nitrate ($NO_3^-$), nitrite ($NO_2^-$), sulfate ($SO_4^{2-}$), perchlorate ($ClO_4^-$), etc.). As used herein, the term "treated water" may correspond to contaminated water from which some or all of the contaminants have been reduced and/or removed.

The systems and/or methods may also, or alternatively, enable an anaerobic suspended growth biological reactor (hereinafter referred to as an "AnSGBR device" or "AnSGBR"), associated with the anaerobic suspended growth water treatment system, to reduce and/or remove the contaminants from contaminated water more efficiently than the previously described attached growth technology. Additionally, or alternatively, the systems and/or methods may enable the presently described AnSGBR device to treat contaminated water using a mixed bacterial culture that includes a combination of facultative and/or anaerobic bacteria (hereinafter, sometimes referred to herein as "microbes" or "microorganisms") that are suspended in a slurry of contaminated water without using attached growth technology. The bacteria may, for example, correspond to a mixed bacterial culture of facultative heterotrophic bacteria, anaerobic heterotrophic bacteria, obligate anaerobic bacteria (e.g., sulfate reducing bacteria) or some combination thereof that is capable of reducing nonmetal, metals and/or metalloids.

The systems and/or methods described herein may enable the AnSGBR device to support a greater and/or more diverse bacterial population at a higher concentration (e.g., associated with the mixed bacterial culture of facultative and/or anaerobic bacteria) than that which is achievable in a conventional reactor associated with the attached growth technology. The greater bacterial diversity and higher bacterial concentration may enable the AnSGBR device to treat a greater quantity of contaminated water within a time period than the conventional reactor based on attached growth technology (e.g., based on a higher flow rate, throughput, etc.). The greater bacterial diversity and/or higher concentration may also, or alternatively, enable the AnSGBR device to treat contaminated water based on a detention time within the AnSGBR device that is less than the detention time associated with the conventional reactor.

The systems and/or methods may also, or alternatively, enable the AnSGBR device to use the higher bacterial population and/or concentration to treat all of the constituent contaminants (e.g., the metals, metalloids, and/or non-metallic contaminants) in a single reactor (e.g., in a single stage, step, operation, etc.), which may be less expensive than the conventional reactor based on the attached growth technology which uses two or more stages and/or conventional reactors to treat the contaminated water. Additionally, or alternatively, the systems and/or methods may enable the AnSGBR device to occupy less space and/or volume than conventional reactors which may enable the AnSGBR device to operate at a lower operating and/or real estate cost than the conventional reactors.

FIG. 1A is a diagram of an example environment 100 in which conventional anaerobic water treatment system 110 (hereinafter, "conventional system 110") operates to treat contaminated water. As shown in FIG. 1A, environment 100 includes an industrial facility that discharges contaminated water that includes one or more contaminants that are to be removed from the contaminated water. Conventional system 110 includes a pretreatment system and one or more conventional reactors (e.g., shown as tanks labeled as "1" or "2"). The pretreatment system receives contaminated water from the industrial facility and uses known methods, techniques, and/or technology to pre-treat the contaminated water. The pretreatment system may, for example, include one or more settling ponds, tanks, pH control devices, filters, etc. to remove certain solids or dissolved constituents from the contaminated water and/or to control the pH of the water for further treatment by conventional system 110.

According to various embodiments, the conventional reactors may receive the pretreated contaminated water from the pretreatment system. Each of the conventional reactors may utilize attached growth technology to support a facultative and/or an anaerobic bacteria layer that reacts with the contaminants within the contaminated water to reduce such contaminants resulting in formation of a precipitate that is collected in the substrate (e.g., that includes sand, granulated activated carbon (GAC), and/or some other material to which bacteria attach) and removed from the contaminated water. The bacterial layers associated with the conventional reactors may correspond to a first bacterial diversity and/or concentration that reacts with the contaminated water.

Conventional system 110 may also, or alternatively, include conventional reactors, associated with attached growth technology, that enable a multi-stage treatment process to be executed. The multi-stage process may include one or more first conventional reactors (e.g., each labeled as "1" in FIG. 1A), associated with a first stage, that treats one or more of the contaminants and one or more second conventional reactors (e.g., each labeled as "2" in FIG. 1A), associated with a second stage, that treats one or more of the remaining contaminants that were not removed during the first stage. Treating the contaminated water may occur during a first time period (e.g., a first detention time (Td1)) during which the contaminated water resides within each conventional reactor while the facultative and anaerobic bacteria reduces one or more of the contaminants for removal from the contaminated water. The multi-stage process may include first conventional reactors and second conventional reactors to provide sufficient bacterial diversity and/or concentration that can substantially reduce and/or remove the contaminants from the contaminated water resulting in treated water. The treated water may be discharged (e.g., shown as "Treated Effluent"), by conventional system 110, to natural waters (e.g., runoff, lakes, rivers, streams, aquifers etc.), a sewage system, a reservoir and/or some other water system or source. The contaminants removed from the contaminated water may be eliminated and/or cleaned from the substrate associated with a conventional reactor through a mechanism, during which contaminated water treatment is temporarily stopped, to cause the reduced contaminants to be detached from the substrate and/or discharged from each conventional reactor for disposal or recovery.

Conventional system 110 is described as including two stages and two conventional reactors for explanatory purposes. Additionally, or alternatively, conventional system 110 may include more than two stages (e.g., 3, 4, 5, etc.) and/or more than one conventional reactor per stage (e.g., 2, 4, 10, 20, etc.). Additionally, or alternatively, while FIG. 1A shows the contaminated water being provided by the industrial facility, in another implementation, the water may also, or alternatively, be obtained from natural waters (e.g., runoff, lakes, rivers, streams, aquifers etc.).

Figure 1B:
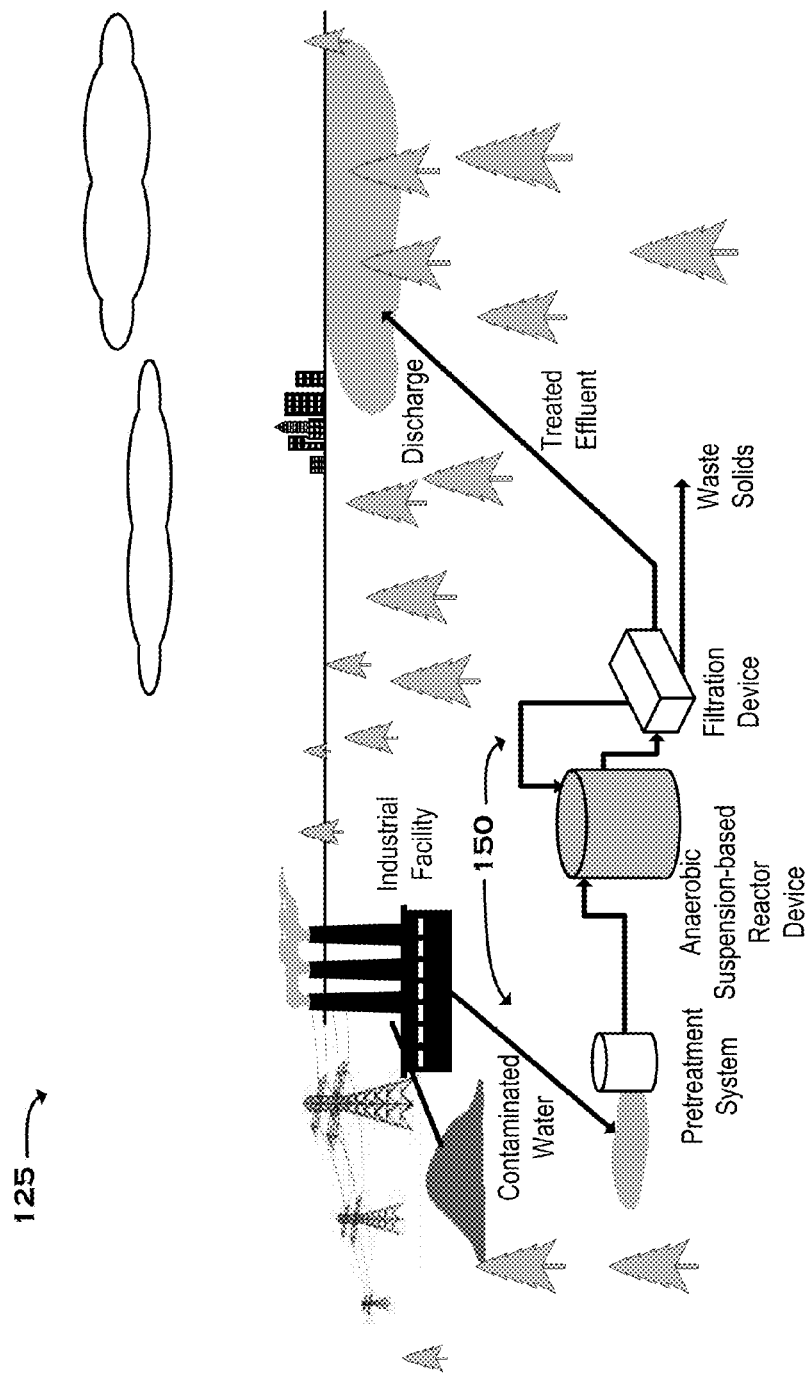
FIG. 1B is a diagram of another example environment in which the system and/or methods, described herein, may be implemented.

FIG. 1B is a diagram of an example environment 125 in which the system and/or methods, described herein, may be implemented. As shown in FIG. 1B, environment 125 may include an industrial facility and an anaerobic suspended growth water treatment system 150 (hereinafter "treatment system 150"). The industrial facility may discharge contaminated water in a manner similar to that described with respect to FIG. 1A. Treatment system 150 may include: a pretreatment system similar to that described above with respect to FIG. 1A; an anaerobic suspended growth reactor device (hereinafter, "AnSGBR device"); and a filtration device. The number of devices and/or systems shown in FIG. 1B is for explanatory purposes only. In practice, there may be additional devices and/or systems, fewer devices and/or systems, different devices and/or systems, or differently arranged devices and/or systems than those shown in FIG. 1B.

According to an embodiment, the AnSGBR device implements suspended growth technology in which a mixed bacterial culture of facultative and/or anaerobic bacteria are suspended in a solution of contaminated water and a carbon-based organic material (hereinafter sometimes referred to as a "slurry") is added to the AnSGBR device as an electron donor to support the growth of a second bacterial diversity and/or concentration within the AnSGBR device. The second bacterial diversity and/or concentration related thereto may be greater than the first bacterial diversity and/or concentration associated with conventional system 110, which may enable a single AnSGBR device to treat a quantity of contaminated water that would take two or more conventional reactors to treat. Additionally, or alternatively, the AnSGBR device may not include a substrate associated with attached growth technology.

In the depicted embodiment the AnSGBR device also, or alternatively, receives pretreated contaminated water from a pretreatment system and, using the second bacterial diversity and/or concentration within the slurry, reduces and/or precipitates substantially all of the contaminants within the contaminated water in a single stage treatment process and/or using an AnSGBR device. As described in greater detail herein, the second bacterial diversity and/or concentration may reduce and/or remove the contaminants within the contaminated water by removal of dissolved oxygen, denitrification, and/or reduction of metals and/or metalloids. If desired, the AnSGBR device may treat the contaminated water during a second time period (e.g., a second detention time (Td2)) that is different from the first time period (e.g., where Td2≠Td1) which may enable treatment system 150 to process a greater quantity of contaminated water within a particular time period than conventional system 110. According to an embodiment, the AnSGBR device may discharge the slurry (including the reduced and/or precipitated contaminants) to the filtration system to remove the contaminants as waste solids for disposal and/or recovery without temporarily stopping the water treatment process to perform a backwash operation. The filtration device may also, or alternatively, discharge the treated water (e.g., shown as "Treated Effluent") to natural waters, a sewage system, or some other water system or source. The filtration device may also, or alternatively, recycle the filtered slurry (including the facultative and/or anaerobic bacteria) back to the AnSGBR device to maintain and/or increase the second bacterial diversity and/or concentration associated with treatment system 150.

According to various embodiments, the single-stage treatment process performed by treatment system 150 may enable the contaminated water to be treated using a first quantity of AnSGBR devices that is less than a second quantity of conventional reactors, which may result in a lower equipment and/or operating cost associated with treatment system 150 relative to conventional system 110. Furthermore, the first quantity of AnSGBR devices may be associated with a first volume of space that is less than a second volume of space that is occupied by the second quantity of conventional reactors, which may result in a lower equipment, capital, real estate and/or operating costs of associated with treatment system 150 relative to conventional system 110.

While FIG. 1B shows the contaminated water being provided by an industrial facility, in another implementation the contaminated water may also, or alternatively, be provided from natural waters (e.g., runoff, lakes, rivers, streams, aquifers, etc.). Additionally, while FIG. 1B shows the AnSGBR device receiving pretreated contaminated water from the pretreatment system, additionally, or alternatively, the AnSGBR device can receive the contaminated water directly from the industrial facility.

Figure 2:
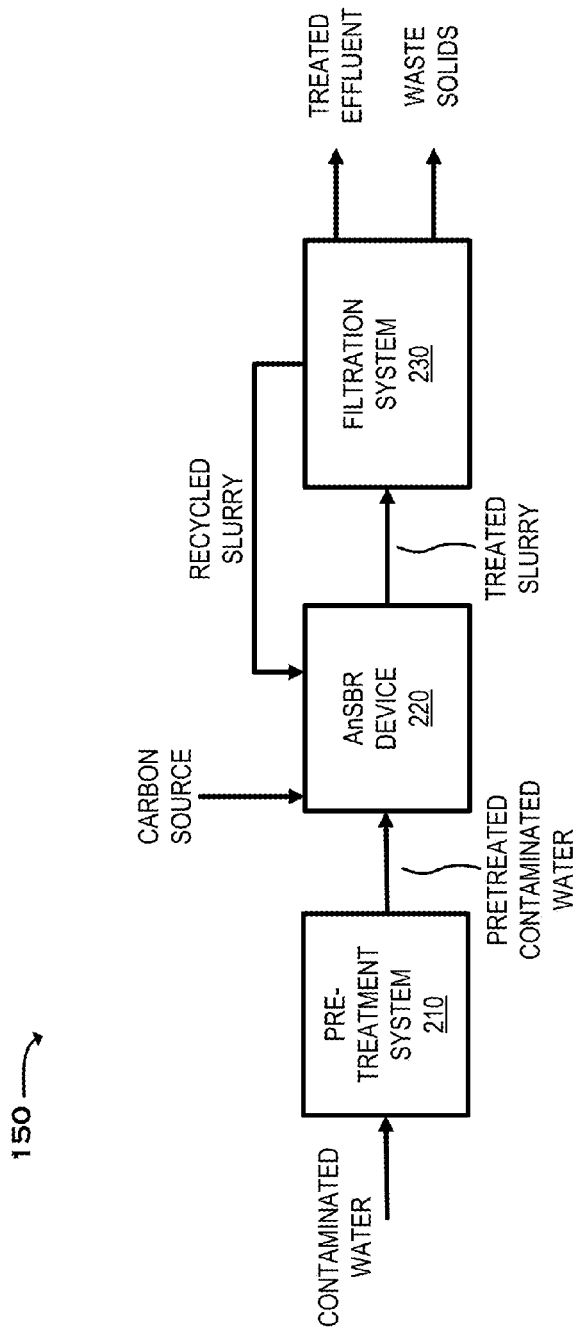
FIG. 2: is a diagram of an example anaerobic suspended growth treatment system of the environment of FIG. 1B.

FIG. 2 is a diagram of an example treatment system 150 of the environment 125 of FIG. 1B. As shown in FIG. 2 treatment system 150 may include pretreatment system 210, AnSGBR device 220, and filtration system 230. The number of devices and/or systems shown in FIG. 2 is for explanatory purposes only. In practice, there may be additional devices and/or systems, fewer devices and/or systems, different devices and/or systems, or differently arranged devices and/or systems.

Also, in some implementations, one or more of the systems and/or devices of treatment system 150 may perform one or more functions described as being performed by another one or more of the devices and/or systems of treatment system 150. Devices and/or systems of treatment system 150 may interconnect mechanically via one or more pipes, valves, fittings, etc. and/or electronically via wired connections, wireless connections, or a combination of wired and wireless connections.

According to various embodiments, pretreatment system 210 may include one or more devices that are capable of receiving and/or storing contaminated water (e.g., contaminated water from runoff, mining operations, FGD contaminated water, drilling operations, etc.) to perform a pretreatment operation on the contaminated water. Pretreatment system 210 may, for example, include a settling pond, tank, reservoir, or other storage medium that enables suspended solids, particulates, and/or other insoluble material within the contaminated water to become separated from the contaminated water (e.g., through settling, floating to the top, etc.). Pretreatment system 210 may also, or alternatively, include a device that causes a substance to be added to the contaminated water to increase or decrease the pH of the contaminated water (e.g., an acid or a base). In one example, pretreatment system 210 may include an automatic pH controller that adds an acid or a base to the contaminated water to cause the pH level of the contaminated water to change (e.g., between a pH of 6 and 8, or some other level) at which the mixed bacterial culture of facultative and/or anaerobic bacteria, associated with AnSGBR device 220, can grow. Additionally, or alternatively, pretreatment system 210 may include a device that can remove certain solids, particulates, and/or other insoluble material from the contaminated water.

Under certain conditions, pretreatment of contaminated water may not be performed (e.g., contaminated water may be sent directly to AnSGBR device 220 without being treated by pretreatment system 220). As examples, such conditions may exist when the suspended solids within the contaminated water are less than a particular threshold (e.g., based on concentration, etc.) and/or when the pH of the contaminated water is suitable for the bacterial population within AnSGBR device 220.

According to yet another embodiment, AnSGBR device 220 may include one or more devices that can treat contaminated water and/or pretreated contaminated water in a manner that causes substantially all of the contaminants, within the contaminated water, to be reduced and/or removed. For example, AnSGBR device 220 may include a container, vessel, and/or receptacle (hereinafter, "vessel") that is of sufficient rigidity to receive and store contaminated water, support a lid, and/or support a mechanism to mix contents within AnSGBR device 220. AnSGBR device 220 may also include, or alternatively, enable to lid to be secured and sealed to the vessel to create an air tight anoxic and/or anaerobic environment within AnSGBR device 220 in a manner that prevents substantially all gases, liquids and/or solids from entering and/or exiting the vessel through an interface between the lid and vessel. The anoxic and/or anaerobic environment may enable AnSGBR device 220 to support a bacterial population that is based on a mixed bacterial culture of facultative and/or anaerobic bacteria that can be used to reduce and/or remove contaminants within the contaminated water. AnSGBR device 220 may include an inlet via which contaminated water, anaerobic bacteria, and/or a carbon-based organic material can be received by AnSGBR device 220 (e.g., to support a mixed bacterial culture of facultative and/or an anaerobic bacterial). The organic material (e.g., shown as "Carbon Source" in FIG. 2) may act as an electron donor to the bacterial population and may include any of a variety of organic compounds such as, for example, low molecular weight alcohols (e.g., methanol, glycerol, etc.), carbohydrate solutions (e.g., molasses, barley malt, etc.), low molecular weight organic acids (e.g., lactic acid), and/or other readily degradable organic compounds. AnSGBR device 220 may also, or alternatively, include an outlet via which the slurry of treated contaminated water, the mixed bacterial culture of facultative and/or anaerobic bacteria, organic material and reduced contaminants (e.g., shown as "treated slurry" in FIG. 2) can be discharged to filtration system 230.

According to yet another embodiment, AnSGBR device 220 may include a device that enables a level of oxidation reduction potential (ORP) (hereinafter, "ORP"), of the slurry within AnSGBR device 220, to be measured, monitored and controlled as a function of time. The device may, for example, correspond to an ORP sensor, ORP data collection and control system, ORP meter, ORP analyzer, ORP controller, and/or some combination thereof (hereinafter, "ORP control system"). Monitoring the ORP may enable an operator, associated with treatment system 150, to determine which contaminant, within the contaminated water, is predominantly being reduced within AnSGBR device 220.

Additionally, or alternatively, the ORP control system may enable the ORP in the AnSGBR device 220 to be controlled and/or managed through the metered introduction of organic material or chemical reductant into AnSGBR device 220. For example, in the event that the ORP level is greater than a first ORP threshold, the operator or ORP control system may cause a concentration level of the organic material or chemical reductant within the contaminated water to increase (e.g., by increasing a flow rate associated with the organic material and/or by decreasing a flow rate of the contaminated water) within the AnSGBR device 220. Increasing the concentration of the organic material or chemical reductant may cause the ORP to decrease and/or may cause an increase in a rate of growth of the bacterial population (e.g., causing an increase in the bacterial diversity and/or concentration) within AnSGBR device 220. Such increase in the rate of growth of the bacterial population may cause a rate at which contaminants are being reduced (hereinafter, a "reduction rate") to increase.

Additionally, or alternatively, in the event that the ORP is less than or equal to a second ORP threshold (the second ORP threshold being less than the first ORP threshold), the operator and/or ORP control system may cause a concentration of the organic material to decrease (e.g., by decreasing the flow rate associated with the organic material and/or by increasing the flow rate of the contaminated water) or chemical oxidant (e.g. increasing the concentration of dissolved oxygen) to increase within AnSGBR device 220. Decreasing the concentration of the organic material or increasing the concentration of chemical oxidant may cause the ORP to increase and/or may cause a decrease in the rate of growth of the bacterial population (e.g., causing a decrease in the bacterial diversity and/or concentration) within AnSGBR device 220. Such decrease in the rate of growth of the bacterial population may cause the reduction rate to decrease. In the event that the ORP is less than or equal to the first ORP threshold and greater than or equal to the second ORP threshold, the ORP control system may not cause the flow rate and/or the concentration level of the organic material or chemical oxidant to increase or decrease.

According to various embodiments, filtration system 230 includes one or more devices that can remove suspended solids, bacteria, precipitated contaminants, and/or other solids from treated slurry and/or discharge such contaminant precipitants as waste solids. Filtration system 230 may, for example, include a device (e.g., an ultra-filtration device, a micro-filtration device, a nano-filtration device, a submerged filtration device, cross flow membrane filtration device, granular media filtration device, screen, micro-screen and/or strainer, and/or some other filtration device) to filter the reduced and/or removed contaminants (e.g., precipitated contaminants) and/or other solids from the treated slurry and may output the filtered contaminants and/or other solids for disposal (e.g., in a landfill, etc.) and/or recovery (e.g., for recycling, industrial processes, etc.). Filtration system 230 may also, or alternatively, include a device that filters the anaerobic bacteria and/or organic material from the treated slurry for discharge back into AnSGBR device 220 (e.g., shown as "recycled slurry" in FIG. 2). Filtration system 230 may also, or alternatively, include a device that discharges and/or outputs the treated and filtered water as treated effluent to natural waters (e.g., in lakes, rivers, ponds, runoff, reservoirs, aquifers, etc.), sewage systems, reservoirs, water systems, water sources, etc. Filtration system 230 may also, or alternatively, include other devices (e.g., displacement pumps, vacuum pumps, control valves, plumbing, tubing, etc.) that can be used as propulsion, flow control, and/or control of the discharged waste solids, recycled slurry, and/or treated effluent.

Figure 3:
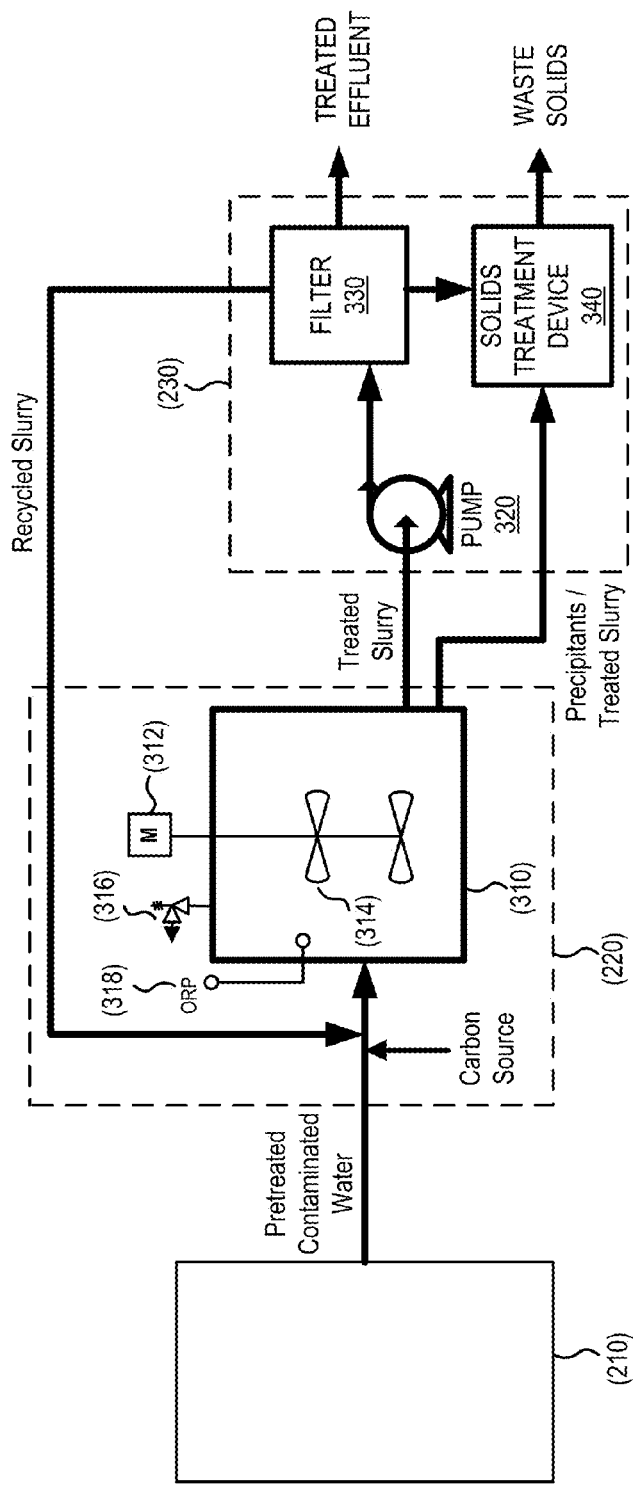
FIG. 3 is a diagram of one or more example components of an anaerobic suspended growth biological reactor device and/or filtration system, associated with the anaerobic treatment system of FIG. 2 that may perform a single-stage water treatment operation.

FIG. 3 is a diagram of various exemplary components associated with AnSGBR device 220 and/or filtration system 230 that can perform a single-stage water treatment operation. As shown in FIG. 3, treatment system 150 may include a collection of systems and/or devices 210—230 as described above with respect to FIG. 2, as well as components 310—318 associated with AnSGBR device 220 and components 320—340 associated with filtration system 230. The number of systems, devices and/or components shown in FIG. 3 is for explanatory purposes only. In practice, there may be additional systems, devices and/or components; fewer systems, devices and/or components; different systems, devices and/or components; or differently arranged systems, devices and/or components than those shown in FIG. 3.

Also, in some implementations, one or more of the systems, devices and/or components of treatment system 150 may perform one or more functions described as being performed by another one or more of the systems, devices and/or components of treatment system 150. Systems, devices and/or components of treatment system 150 may be interconnected via one or more pipes, hoses, valves, fittings, etc. and/or electronically via wired connections, wireless connections, or a combination of wired and wireless connections. Though not shown in FIG. 3, any electrically powered devices may be connected to a direct current and/or alternating current source as applicable.

According to the embodiment shown in FIG. 3, AnSGBR device 220 may include a vessel 310 (hereinafter, "vessel 310") into which a slurry of contaminated water (e.g., raw contaminated water and/or pretreated contaminated water), organic material, and a mixed bacterial culture of facultative and/or anaerobic bacteria flow. AnSGBR device 220 may further include a motor 312 that is attached to vessel 310 and which is connected to a mixer 314 to mix the slurry to maintain the mixed bacterial culture of facultative and anaerobic bacteria and/or other solids in suspension. In one example, AnSGBR device 220 may correspond to a complete mixed stirred tank reactor (CSTR). AnSGBR device 220 may also, or alternatively, include a valve 316 to enable gaseous byproduct (e.g., nitrogen ($N_2$), carbon dioxide ($CO_2$), etc.) of the reduction reaction within AnSGBR device 220 to exit vessel 310 without permitting any gases outside of AnSGBR device 220 to enter vessel 310. Furthermore, AnSGBR device 220 may further include an ORP control system 318 to measure, monitor and/or control the ORP associated with the slurry within AnSGBR device 220 and/or to control a concentration of the organic material within vessel 310 and/or a flow rate of such organic material entering vessel 310.

AnSGBR device 220 may, for example, perform a water treatment process based on reduction of contaminants by the mixed bacterial culture of facultative and/or anaerobic bacteria suspended in AnSGBR device 220. The reactions responsible for the water treatment process may include microbial reactions associated with the mixed bacterial culture facultative and/or anaerobic bacteria, chemical reactions, and/or a combination of microbial and/or chemical reactions.

For example, AnSGBR device 220 may perform a first microbial reaction to remove dissolved oxygen (DO) from the contaminated water in accordance with the following reaction:

$$O_{2(aq)} + \text{Organic Carbon} \rightarrow CO_2 + H_2O + \text{Biomass}$$

This reaction may be performed by aerobic and facultative heterotrophic bacteria in which the organic carbon acts as an electron donor and the dissolved oxygen is an electron acceptor. The reaction may produce water ($H_2O$), carbon dioxide gas ($CO_2$), and biological material in the form of new bacteria and/or microorganisms (biomass). The biomass may indicate that microorganisms (e.g., facultative and/or anaerobic bacteria) are produced as a result of microbial growth of the bacterial population. The dissolved oxygen may be removed to enable one or more microbial reduction reactions to occur for denitrification, reduction of oxyanions, and reduction of sulfate.

For example, the facultative heterotrophic bacteria, within AnSGBR device 220 may enable a denitrification process to occur to reduce nitrate ($NO_3^-$) and/or nitrite ($NO_2^-$) to nitrogen gas ($N_2$) in accordance with the following reaction:

$$NO_3^-(\text{or } NO_2^-) + \text{Organic Carbon} \rightarrow CO_2 + H_2O + N_2 + \text{Biomass}$$

In this reaction the facultative heterotrophic bacteria use organic carbon as their electron donor and nitrate or nitrite as electron acceptors. The process produces inert nitrogen gas ($N_2$), which may be discharged from AnSGBR device 220 via valve 316.

Additionally, or alternatively, particular anaerobic bacteria (e.g., sulfate reducing bacteria), within AnSGBR device 220, may enable a sulfate reducing reaction to occur. The sulfate reducing process may be performed by sulfate reducing bacteria that correspond to obligate anaerobic bacteria that reduce sulfates ($SO_4^{2-}$) to carbon dioxide gas, water, sulfide ($S^{2-}$) and biomass in accordance with the following reaction:

$$SO_4^{2-} + \text{Organic Carbon} \rightarrow CO_2 + H_2O + S^{2-} + \text{Biomass}$$

In this reaction, the sulfate reducing bacteria use organic carbon as their electron donor and sulfate as an electron acceptor.

Additionally, or alternatively, the anaerobic bacteria, within AnSGBR device 220, may enable reduction reactions to occur to reduce metals and/or metalloids such as, for example, As, Cr, Fe, Mn, Se, Tc, and U. For some of these reactions the metal serves as a terminal electron acceptor for the organisms while for others, reduction occurs as a result of non-specific enzymatic pathways or chemical reduction resulting from reductants produced by the anaerobic bacteria. Thus, these metals and/or metalloids may be reduced by the anaerobic bacteria from a dissolved state (e.g., as a soluble oxyanion in the contaminated water) under oxidizing conditions to an insoluble state as a precipitate (e.g., under reducing conditions). Below is an example process to reduce selenate ($SeO_4^{2-}$) and/or selenite ($SeO_3^{2-}$) to elemental selenium (Se):

$$SeO_4^{2-} + \text{Organic Carbon} \rightarrow SeO_3^{2-} + \text{Organic Carbon} \rightarrow Se + CO_2 + H_2O$$

In this example, selenate and selenite act as terminal electron acceptors for microorganisms and organic carbon serves as the electron donor.

Table 1 below identifies representative soluble species of the metals and/or metalloids under oxidizing conditions and insoluble species of the metals and/or metalloids under reducing conditions.

TABLE 1

Representative Species for Selected Metals and Metalloids under Oxidizing and Reducing Conditions.

| Element | Oxidizing Conditions | Reducing Conditions |
|---|---|---|
| Arsenic | $AsO_4^{3-}$, $AsO_3^{2-}$ | $As_2S_{2(s)}$, $As_2S_{3(s)}$ |
| Chromium | $CrO_4^{2-}$ | $CrO_{2(s)}$, $CrO_{3(s)}$, $Cr_2O_{3(s)}$ |
| Molybdenum | $MoO_4^{2-}$ | $MoO_{2(s)}$, $MoO_{3(s)}$, $MoS_{2(s)}$ |
| Selemium | $SeO_4^{2-}$, $SeO_3^{2-}$ | $Se_{(s)}$ |
| Technetium | $TcO_4^-$ | $Tc_2O_{7(s)}$ |
| Vanadium | $VO_4^{3-}$ | $VO_{(s)}$, $V_2O_{3(s)}$ |
| Uranium | $UO_2(CO_3)_2^{2-}$ | $UO_{2(s)}$, $USiO_{4(s)}$ |

One or more of the reactions (e.g., oxygen removal, nitrate and nitrite reduction, sulfate reduction, metal and metalloid reduction) described above, may be performed on a continuous basis and concurrently within a period of time by AnSGBR device 220. For example, as particular contaminated water flows into AnSGBR device 220, some or all of the reactions may already be occurring in water that previously flowed into the AnSGBR device 220 (e.g., prior to the inflow of the particular contaminated water). The aerobic and facultative heterotrophic bacteria within AnSGBR device 220 may react with the particular contaminated water to remove dissolved oxygen within the particular water. Additionally, or alternatively, the facultative heterotrophic bacteria within AnSGBR device 220 may react with the particular contaminated water that performs denitrification during or after the completion of the oxygen removal reaction. Additionally, or alternatively, the sulfate reducing bacteria within AnSGBR device 220 may react with the particular contaminated water to reduce the sulfate within the particular water during or after the completion of one or more of the oxygen removal and/or denitrification reactions. Additionally, or alternatively, the anaerobic bacteria within AnSGBR device 220 may react with the particular contaminated water to reduce the metals and/or metalloids within the particular water during or after the completion of one or more of the oxygen removal, denitrification, and/or sulfate reduction reactions. AnSGBR device 220 may output and/or discharge to filtration system 230, treated slurry, which may include the reduced contaminant precipitates as a result of any one or more of the reactions described above.

Generation of sulfide ($S^{2-}$) by the sulfate reducing bacteria may cause the precipitation of other metals in the contaminated water including but not limited to cadmium (Cd), copper (Cu), lead (Pb), mercury (Hg), and zinc (Zn). Precipitates of these metals may be in suspension with the microorganisms within AnSGBR device 220 and may be removed by the filtration system 230.

As shown, the filtration system 230 shown in the figure includes a pump 320, a filter 330, and a solids treatment device 340. Pump 320 may include one or more devices that can cause fluid (e.g., treated slurry, precipitants, etc.) to flow from AnSGBR device 220 to filter 330. Pump 320 may, for example, correspond to a displacement pump, centrifugal pump, etc. that can dynamically draw and/or receive slurry from an outlet of vessel 310 and impel and/or force the slurry to filter 330. Filter 330 may include one or more devices that can perform filtration on the slurry received pump 320. Filter 330 may, for example, correspond to one or more cross-flow membrane filters (e.g., an ultra-filtration device, micro-filtration device, nano-filtration device, or some other membrane filtration device), a granular media filtration device, and/or some other filtration device that can separate and/or remove the anaerobic and/or facultative bacteria and chemical precipitates from the slurry and transport and/or recycle the bacteria, as recycled slurry back to AnSGBR 220 to maintain the bacterial diversity and/or concentration within AnSGBR device 220. Filter 330 may also, or alternatively, discharge as treated water the contaminated water from which the contaminants and facultative and anaerobic bacteria have been removed (e.g., shown as "treated effluent" in FIG. 3), to natural waters, a sewage system, a reservoir, and/or some other water system or source. Solids treatment device 340 may include any device that can receive the bacterial and/or microbial solids, and/or precipitated metals and/or metalloids from AnSGBR device 220 and/or filter 330 and remove water from the solids and/or precipitate (e.g., through settling, filtration, centrifugation, evaporation, solar, heat treatments, etc.) and discharge the solids and/or precipitate as waste solids for recovery (e.g., for recycling, use in industrial processes, etc.) or disposal (e.g., at a landfill, etc.).

Figure 4:
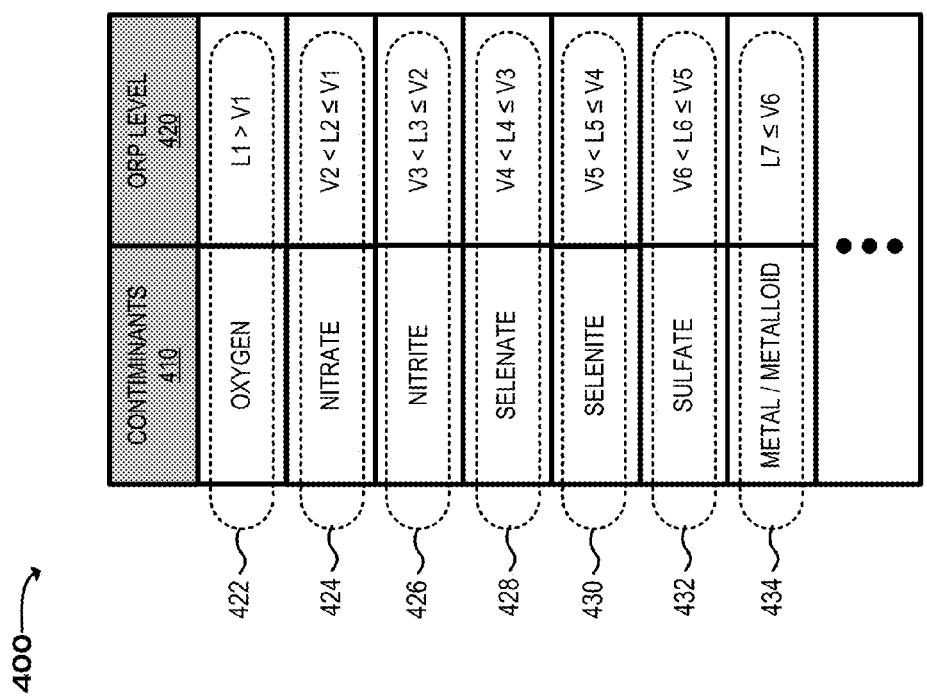
FIG. 4 is a diagram of example levels of oxidation-reduction potential that may be associated with the anaerobic suspended growth biological reactor of FIG. 3.

FIG. 4 is a table of example ORP 400 that may be associated with AnSGBR device 220. For example, ORP 400 may include contaminants field 410 and an ORP level field 420. The number of fields in ORP 400 is provided for explanatory purposes. In practice there may be more fields, fewer fields, different fields, or differently arranged fields than are shown in FIG. 4.

Contaminants field 410 may identify a type of contaminant within contaminated water that is treated by AnSGBR device 220. The type of contaminant may, for example, correspond to non-metals and/or metalloids (e.g., dissolved oxygen, nitrate, nitrite, sulfate, perchlorate, etc.) and/or metals and/or metalloids (e.g., selenate, selenite, arsenic, mercury, etc.). ORP field 420 may identify an ORP and/or a range of ORP values that correspond to a type of reaction that is the principal and/or predominant reaction occurring within AnSGBR device 220 during a water treatment process.

For example, as the water treatment process, as described above with respect to FIG. 3, continues, ORP control system 318 may monitor ORP levels within AnSGBR device 220. ORP device 318 may, for example, indicate a first ORP (e.g., L1) that is greater than a first ORP threshold (e.g., V1, where L1>V1 as shown by ellipse 422 of FIG. 4), which may indicate that the oxygen in the slurry affects the reactions that are occurring within AnSGBR device 220 and/or may control the biological and/or chemical reactions. In this example, the predominance of the oxygen removal reaction may indicate that a greatest portion of the contaminated water is being treated to remove the dissolved oxygen relative to one or more other electron acceptors in the contaminated water that are being treated to remove other contaminants (e.g., nitrate, nitrite, sulfate, etc.). For example, the first ORP may correspond to a first value (e.g., 800 millivolts (mV)) when the reduction of oxygen (e.g., $O_2 \rightarrow H_2O$) predominates within AnSGBR device 220. Additionally, or alternatively, the first ORP may correspond to a different first value (e.g., 970 mV) when the reduction of perchlorate (e.g., $ClO_4^- \rightarrow Cl^-$) predominates within AnSGBR device 220. As a non-limiting, specific example, the first ORPs in the preceding examples may occur when environmentally relevant conditions exist, such a slurry pH approximately equal to 7 and a contaminant concentration approximately equal to $1 \times 10-6$ mole per liter (mol/L).

Additionally, or alternatively, ORP device 318 may indicate a second ORP (e.g., L2) that is less than or equal to the first ORP threshold and greater than a second ORP threshold (e.g., V2, where V2<L1≤V1 as shown by ellipse 424 of FIG. 4), which may indicate that the denitrification (e.g., reduction of nitrate and/or nitrite) reactions predominate within AnSGBR device 220. For example, the second ORP may correspond to a second value (e.g., 740 mV) when denitrification (e.g., $NO_3^- \rightarrow N_2$) predominates within AnSGBR device 220. Additionally, or alternatively, the first ORP may correspond to a different first value (e.g., 970 mV) when the reduction of perchlorate (e.g., $ClO_4^- \rightarrow Cl^-$) predominates within AnSGBR device 220. The first ORPs in the preceding examples may occur when environmentally relevant conditions exist, such a slurry pH approximately equal to 7 and a contaminant concentration approximately equal to $1 \times 10-6$ mole per liter (mol/L).

During the water treatment processes, ORP device 318 may indicate other ORP values (e.g., L3, L4, L5, etc.) that are progressively less as the contaminants, within AnSGBR device 220, are further reduced (e.g., from denitrification, to selenate/selenite reduction, to sulfate reduction, to other metal/metalloid reduction) (e.g., as shown by ellipses 426-434 in FIG. 4). For example, when the ORP, associated with AnSGBR device 220 may correspond to a third value (e.g., 540 mV) when the reduction of chromate (e.g., $CrO_4^{2-} \rightarrow Cr_2O_{3(s)}$) predominate within AnSGBR device 220; a fourth value (e.g., 270 mV) when the reduction of selenate (e.g., $SeO_4^{2-} \rightarrow Se_{(s)}$) predominates within AnSGBR device 220; a fifth value (e.g., -180 mV) when the reduction of dihydrogenarsenate (e.g., $H_2AsO_4^- \rightarrow As_2O_{3(s)}$) predominates within AnSGBR device 220; a sixth value (e.g., -220 mV) when the reduction of sulfate (e.g., $SO_42- \rightarrow HS^-$) predominates within AnSGBR device 220; etc. The ORPs in the preceding examples may occur when environmentally relevant conditions exist, such a slurry pH approximately equal to 7 and a contaminant concentration approximately equal to $1 \times 10-6$ mole per liter (mol/L).

Additionally, or alternatively, ORP device 318 may use the ORP to regulate the flow rate of the organic material (e.g., shown as "carbon source" in FIG. 3) into AnSGBR device 220 to control the bacterial diversity and/or concentration within AnSGBR device 220. For example, in the event that the ORP is greater than an ORP threshold associated with non-metal contaminants (e.g., first, second, and/or third ORP thresholds V1, V2 and/or V3, respectively), ORP device 318 may cause the flow of the organic material to increase. Increasing the flow may increase a concentration of electron donors within AnSGBR device 220, which may enable the bacterial diversity and/or concentration to be sustained or increase within AnSGBR device 220. Additionally, or alternatively, in the event that the ORP level is less than or equal to a different ORP threshold associated with metal or metalloid contaminant (e.g., fifth, sixth, or some other ORP thresholds V5, V6, and/or V7, etc., respectively), ORP device 318 may cause the flow associated with the organic material or chemical reductant to decrease. Decreasing the flow may decrease the concentration of electron donors within AnSGBR device 220, which may enable the bacterial diversity and/or concentration to be sustained or decrease within AnSGBR device 220. In the event that the ORP is less than or equal to the ORP threshold and greater than the different ORP threshold, ORP device 318 may not increase or decrease the flow of the organic material or chemical reductant, which may enable the bacterial population and/or concentration to remain approximately the same.

Additionally, or alternatively, changing the flow of organic material into AnSGBR device 220 may cause a change in the nature and types of bacteria within AnSGBR device 220. For example, increasing the flow rate of organic material or chemical reductant and consequent decrease in the ORP may result in increased growth rate of anaerobic bacteria and/or reduced growth rate of facultative bacteria. Such increased growth rate of anaerobic bacteria and/or reduced growth rate of facultative bacteria may enhance the reduction of contaminants such as, for example, selenate, arsenate and/or sulfate.

Figure 5:
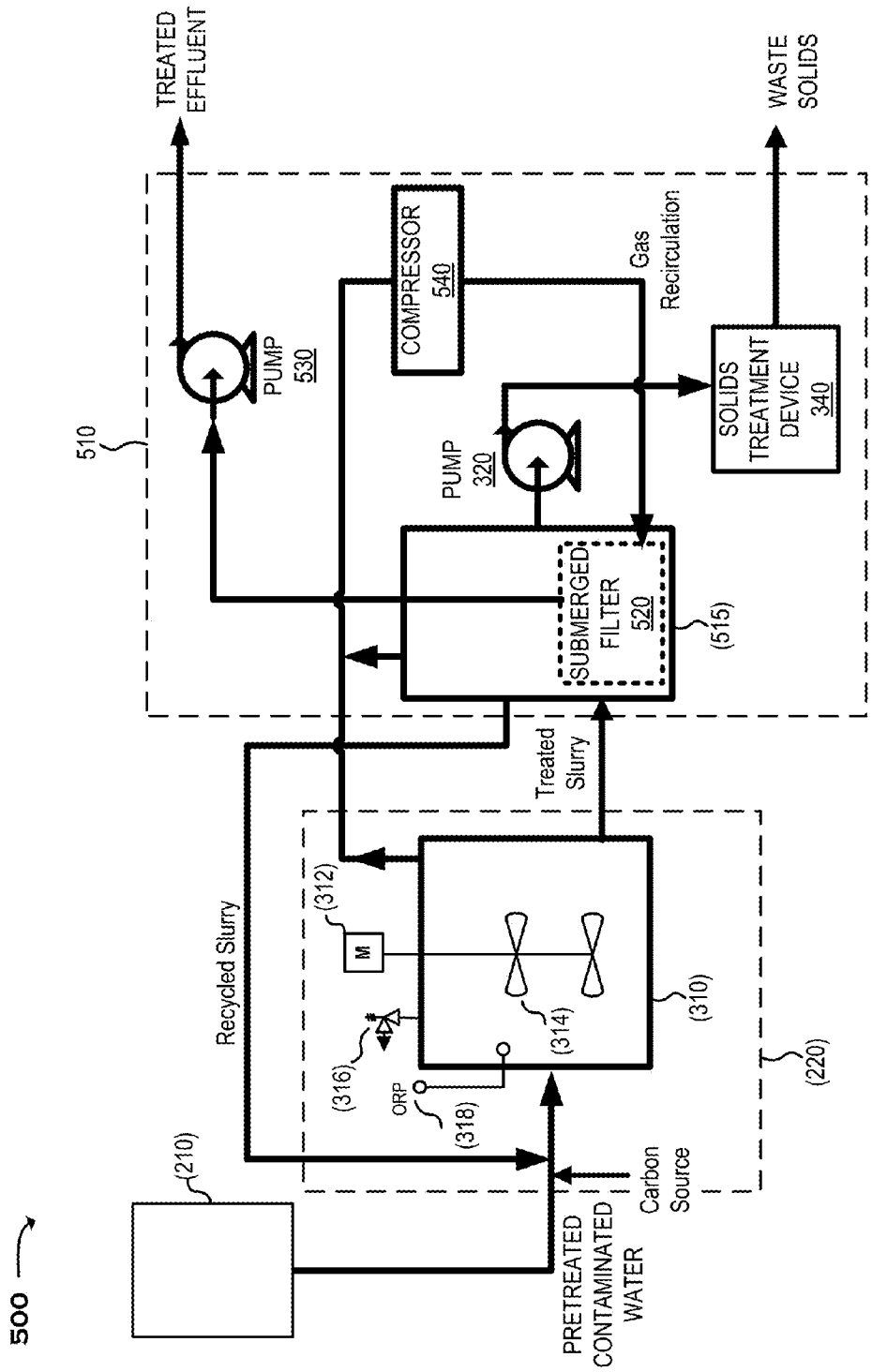
FIG. 5 is a diagram of another anaerobic suspended growth treatment system that may be capable of performing a single-stage water treatment operation.

FIG. 5 is a diagram of one or more example components of an anaerobic suspended growth treatment system 500 (hereinafter "treatment system 500"), that is capable of performing a single-stage water treatment operation. As shown in FIG. 5, treatment system 500 may include pretreatment system 210 as described with respect to FIG. 2, components of AnSGBR device 220 as described in FIG. 3 and a filtration system 510. The number of systems, devices and/or components shown in FIG. 5 is for explanatory purposes only. In practice, there may be additional systems, devices and/or components; fewer systems, devices and/or components; different systems, devices and/or components; or differently arranged systems, devices and/or components than those shown in FIG. 5.

Also, in some implementations, one or more of the systems, devices and/or components of treatment system 500 may perform one or more functions described as being performed by another one or more of the systems, devices and/or components of treatment system 500. Systems, devices and/or components of treatment system 500 may interconnect via one or more pipes, hoses, valves, fittings, etc. and/or electronically via wired connections, wireless connections, or a combination of wired and wireless connections. Though not shown in FIG. 5, any electrically powered devices may be connected to a direct current and/or alternating current source as applicable.

Filtration system 510 may include pump 320, dryer 340, a vessel 515, a submerged filter 520, a pump 530 and a compressor 540. Vessel 515 may include a device that can receive and/or store treated slurry received from AnSGBR device 220 in a manner that maintains the treated slurry in an airtight, anoxic/anaerobic environment. Vessel 515 may, for example, correspond to a container, tank, vessel, etc. with an airtight lid, an inlet through which the treated slurry is received, and/or an outlet to pump 320. Vessel 515 may include a submerged filter 520 that includes one or more filter devices, such as a membrane filter (e.g., an ultrafiltration, microfiltration, nano-filtration, etc. filter), a granular media filtration device, a ceramic filtration device, a screen, microscreen, strainer and/or some other filtration device that can separate contaminated water precipitants and/or anaerobic and facultative bacteria from the treated water. Submerged filter 520 may discharge and/or output the filtered water to pump 530. Additionally, or alternatively, submerged filter 520 may output to AnSGBR device 220, as recycled slurry, the facultative and/or anaerobic bacteria that enables the diversity and/or concentration of the mixed bacterial culture of facultative and anaerobic bacteria, within AnSGBR device 220 to be maintained.

While submerged filter 520 is described with respect to FIG. 5 as being within the anoxic and/or anaerobic environment associated with vessel 515, additionally, or alternatively, submerged filter 520 may be integrated within and/or submerged within vessel 310 of AnSGBR device 220. In this example, treatment system 500 may not include vessel 515 (e.g., the filtration operation is performed within AnSGBR device 220) and/or may reduce equipment costs.

Pump 530 may include one or more devices (e.g., a displacement pump, centrifugal pump, etc.) that receives the treated water and discharges and/or outputs the filtered water as treated effluent to natural waters (e.g., runoff, lakes, rivers, streams, aquifers, etc.), a sewage system, reservoir, and/or some other water system or source.

Compressor 540 may receive and/or draw gases (e.g., nitrogen ($N_2$), carbon dioxide ($CO_2$), etc.) from vessel 310 (e.g., from the headspace of vessel 310) and may compress the gases for output to submerged filter 520 via vessel 515. The compressed gases may enter submerged filter 520 and may flow across filtration components (e.g., membranes) to clean submerged filter 520 by removing and/or dislodging (e.g., sometimes referred to as "scouring") solids that have become attached within and/or on to the filtration components.

Pump 320 may dynamically draw and/or receive treated slurry that includes the reduced contaminant precipitants from an outlet of vessel 515 and impel and/or force the slurry and/or precipitants to solids treatment device 340. Solids treatment device 340 may receive the slurry and/or contaminant precipitates from pump 320 and may remove water from the slurry and/or precipitates (e.g., through filtration, centrifugation, evaporation, solar, heat treatments, etc.) and discharge the precipitants as waste solids for recovery (e.g., for recycling, use in industrial processes, etc.) or disposal (e.g., at a landfill, etc.).

Figure 6:
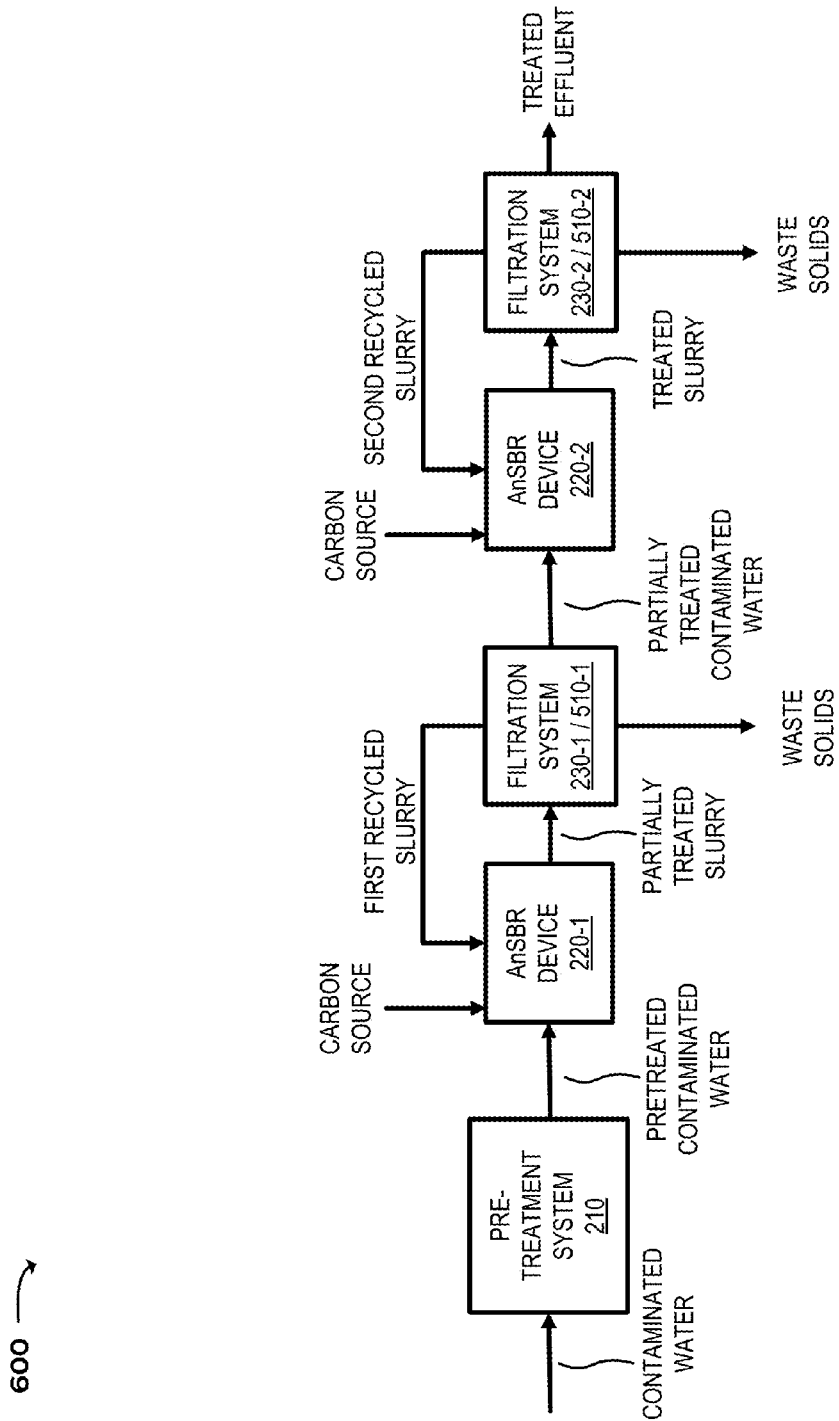
FIG. 6 is a diagram of an example anaerobic suspended growth treatment system that may be capable of performing a multi-stage water treatment operation, including a maturation anoxic/anaerobic stage, an aeration stage, a chemical precipitation stage, and a post filtration stage

FIG. 6 is a diagram of an example of a two-stage anaerobic suspended growth treatment system 600 (hereinafter, "treatment system 600") that may be capable of performing a multi-stage contaminated water treatment operation. As shown in FIG. 6, treatment system 600 may include a pretreatment system 210, a pair of AnSGBR devices 220-1 and 220-2, and a pair of filtration systems 230-1/510-1 and 230-2/510-2. The number of devices and/or systems shown in FIG. 6 is for explanatory purposes only. In practice, there may be additional devices and/or systems, fewer devices and/or systems, different devices and/or systems, or differently arranged devices and/or systems than those shown in FIG. 6.

Also, in some implementations, one or more of the systems and/or devices of treatment system 600 may perform one or more functions described as being performed by another one or more of the devices and/or systems of treatment system 600. Devices and/or systems of treatment system 600 may interconnect mechanically via one or more pipes, valves, fittings, etc. and/or electronically via wired connections, wireless connections, or a combination of wired and wireless connections.

For example, pretreatment system 210 may, in a manner similar to that described above with respect to FIG. 2, receive contaminated water, pretreat the contaminated water, and/or output and/or discharge the pretreated contaminated water to a first AnSGBR device 220 (e.g., AnSGBR device 220-1). First AnSGBR device 220 may correspond to a first stage of a contaminated water treatment operation that treats a first portion of the contaminants within the pretreated contaminated water. For example, first AnSGBR device 220 may, in a manner similar to that described above with respect to FIG. 3, partially treat some or all of the contaminants (e.g., non-metals, metals, and/or metalloids) within the contaminated water. Additionally, or alternatively, first AnSGBR device 220 may treat the pretreated contaminated water to selectively remove and/or reduce the first portion of contaminants, such as certain non-metals and/or nonmetalloid contaminants, within the contaminated water. Such treatment may, for example, include performing reactions to remove dissolved oxygen from the contaminated water, reduce the nitrates and/or nitrates through denitrification reactions, and/or reduce other non-metals and/or non-metalloids as described above with respect to FIG. 3. First AnSGBR device 220 may also, or alternatively, output and/or discharge the partially treated slurry (e.g., that does not include dissolved oxygen, nitrates, nitrites, and/or other non-metals and/or metalloids) to first filtration system 230/510 (e.g., filtration system 230-1/540-1).

First filtration system 230/540 may correspond to the first stage of the contaminated water treatment operation and may perform a filtration operation on the partially treated slurry in a manner similar to that described with respect to FIG. 3 when first filtration system 230/540 corresponds to filtration system 230 and may perform a filtration operation in a manner similar to that described with respect to FIG. 5 when first filtration system 230/540 corresponds to filtration system 540 of FIG. 5. First filtration system 230/540 may output the first recycled slurry (e.g., that includes a mixed bacterial culture facultative and/or anaerobic bacteria, precipitates, and other solids removed from the partially treated slurry) to first AnSGBR device 220 to maintain a first biological diversity and/or concentration within first AnSGBR device 220. First filtration system 230/540 may also, or alternatively, output any excess biological solids, reduced contaminant precipitates, and other suspended solids as waste solids for disposal (e.g., in a landfill, etc.) and/or recovery (e.g., for reuse in an industrial process, recycling, etc.). First filtration system 230/540 may output and/or discharge partially treated contaminated water (e.g., that includes contaminants that were not reduced in the first stage) to second AnSGBR device 220 (e.g., AnSGBR device 220-2).

Second AnSGBR device 220 may correspond to a second stage of the contaminated water treatment operation that treats a second portion of the contaminants, within the partially treated contaminated water, that were not removed during the first stage. For example, second AnSGBR device 220 may, in a manner similar to that described above with respect to FIG. 3, treat contaminants (e.g., non-metals, metals, and/or metalloids), within the contaminated water, that were not treated by first AnSGBR device 220. Additionally, or alternatively, second AnSGBR device 220 may, in a manner similar to that described above with respect to FIG. 3, treat the partially treated contaminated water to selectively remove and/or reduce sulfates, metals and/or metalloids (e.g., As, Cd, Cr, Cu, Hg, Mo, Pb, Sb, Se, Tc, Tl, V, U, and Zn) within the partially treated contaminated water. First AnSGBR device 220 may output and/or discharge the treated slurry (e.g., that does not include sulfates, metals, metalloids described above) to second filtration system 230/510 (e.g., filtration system 230-2/510-2).

Second filtration system 230/510 may correspond to the second stage of the contaminated water treatment operation and may perform a filtration operation on the treated slurry in a manner similar to that described with respect to FIG. 3 when second filtration system 230/510 corresponds to filtration system 230 and may perform a filtration operation in corresponds to filtration system 510 of FIG. 5. Second filtration system 230/540 may output second recycled slurry (e.g., that includes facultative and/or anaerobic bacteria removed from the treated slurry) to second AnSGBR device 220 to maintain the second biological population and/or concentration within the anoxic and/or anaerobic environment within second AnSGBR device 220. Second filtration system 230/510 may also, or alternatively, output any excess biological solids, reduced contaminant precipitates or other suspended solids as waste solids for disposal (e.g., in a landfill, etc.) and/or recovery (e.g., for reuse in an industrial process, recycling, etc.). Second filtration system 230/510 may output and/or discharge treated water as treated effluent to natural waters, a sewage system, a reservoir, and/or some other water system or source.

Treatment system 600 is described with respect to FIG. 6 as including two stages for explanatory purposes. In practice, treatment system 600 may include two or more stages using two or more AnSGBR devices 220, filtration systems 230, and/or filtration system 510. Additionally, or alternatively, treatment system 600 may enable the first biological diversity and/or concentration to be managed to a greater degree of precision (e.g., within a smaller range of ORP values) than treatment system 300 of FIG. 3 (e.g., associated with a single stage contaminated water treatment operation) to ensure the first contaminants are treated by the first AnSGBR device 220. Similarly, treatment system 600 may enable the second biological diversity and/or concentration to be managed to a greater degree of precision (e.g., at an appropriate range of ORP values) than treatment system 300 (FIG. 3) to ensure the second contaminants are treated by the second AnSGBR device 220. Thus, treatment system 600 may ensure that a greater quantity of contaminants are reduced and/or removed from the contaminated water relative to treatment system 300 that performs the single stage water treatment operation. Additionally, or alternatively, the multi-stage contaminated water treatment operation may enable contaminants to be reduced and/or removed from a greater quantity of water relative to the single stage operation (e.g., based on a higher flow rate or throughput relative to the single stage operation).

Additionally, or alternatively, treatment system 600 may correspond to a hybrid treatment system 600 that includes a combination of one or more AnSGBR devices 220 and one or more conventional reactor, associate with attached growth technology. Additionally, or alternatively, under certain conditions, first AnSGBR device 220 may receive contaminated water directly from a source without being pretreated by pretreatment system 210 when the quality of the influent contaminated water is suitable for bacterial and/or microbial growth in the first AnSGBR device 220.

Figure 7:
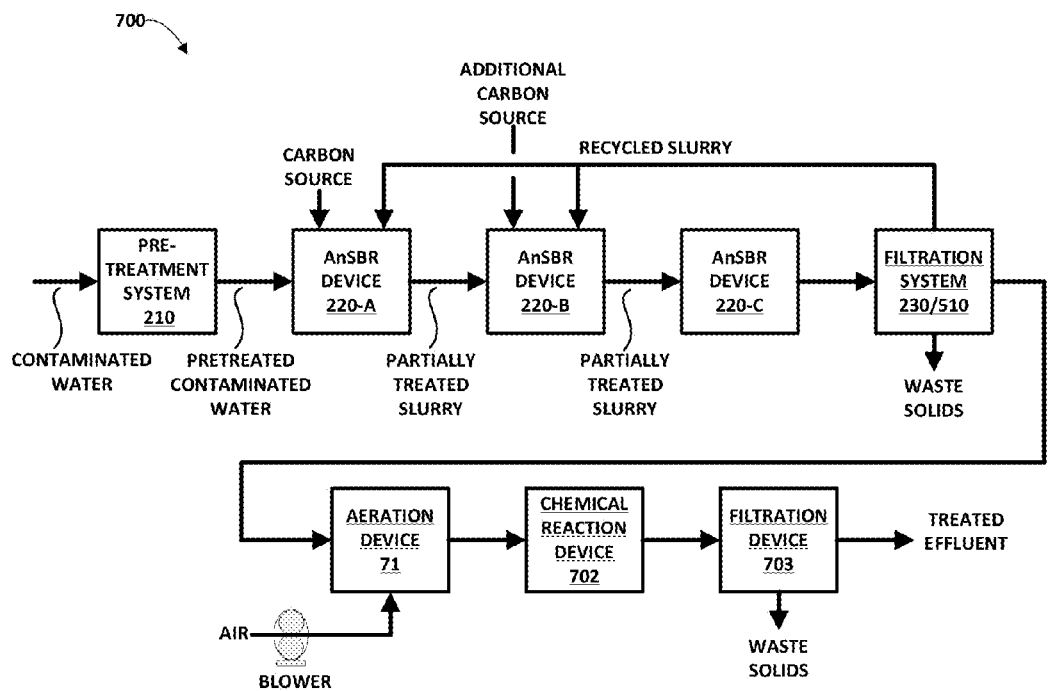
FIG. 7 is a diagram of an example of a multi-stage anaerobic suspended growth treatment system according to another embodiment of the present disclosure

FIG. 7 is a diagram of an example of a multi-stage anaerobic suspended growth treatment system 700 (hereinafter, "treatment system 700") that may be capable of performing a multi-stage contaminated water treatment operation. As shown in FIG. 7, treatment system 700 may include a pretreatment system 210, multiple AnSGBR devices 220-A, 220-B, and 220-C, filtration system 230/510, an aeration device 701, a chemical reaction device 702, and final filtration device 703. The number of devices and/or systems shown in FIG. 7 is for explanatory purposes only. In practice, there may be additional devices and/or systems, fewer devices and/or systems, different devices and/or systems, or differently arranged devices and/or systems than those shown in FIG. 7.

Also, in some implementations, one or more of the systems and/or devices of treatment system 700 may perform one or more functions described as being performed by another one or more of the devices and/or systems of treatment system 700. Devices and/or systems of treatment system 700 may interconnect mechanically via one or more pipes, valves, fittings, etc. and/or electronically via wired connections, wireless connections, or a combination of wired and wireless connections.

For example, pretreatment system 210 may, in a manner similar to that described above with respect to FIG. 2, receive contaminated water, pretreat the contaminated water, and/or output and/or discharge the pretreated contaminated water to a first AnSGBR device 220 (e.g., AnSGBR device 220-A). First AnSGBR device 220 may correspond to a first stage of a contaminated water treatment operation that treats a first portion of the contaminants within the pretreated contaminated water. For example, first AnSGBR device 220 may, in a manner similar to that described above with respect to FIG. 3, partially treat some or all of the contaminants (e.g., non-metals, metals, and/or metalloids) within the contaminated water. Additionally, or alternatively, first AnSGBR device 220 may treat the pretreated contaminated water to selectively remove and/or reduce the first portion of contaminants, such as certain non-metals and/or nonmetalloid contaminants, within the contaminated water. Such treatment may, for example, include performing reactions to remove dissolved oxygen from the contaminated water, reduce the nitrates and/or nitrites through denitrification reactions, and/or reduce other non-metals and/or non-metalloids as described above with respect to FIG. 3. First AnSGBR device 220 may also, or alternatively, output and/or discharge the partially treated slurry (e.g., that does not include dissolved oxygen, nitrates, nitrites, and/or other non-metals and/or metalloids) to Second AnSGBR device 220 (e.g., AnSGBR device 220-B). Second AnSGBR device 220 may correspond to a second stage of a contaminated water treatment operation that treats a first portion of the contaminants within the partially treated contaminated water. For example, second AnSGBR device 220 may, in a manner similar to that described above with respect to FIG. 3, partially treat some or all of the contaminants (e.g., non-metals, metals, and/or metalloids) within the contaminated water. Additionally, or alternatively, second AnSGBR device 220 may treat the partially treated contaminated water to selectively remove and/or reduce the first portion of contaminants, such as certain non-metals and/or nonmetalloid contaminants, within the contaminated water. Such treatment may, for example, include performing reactions to remove and/or reduce other non-metals and/or non-metalloids as described above with respect to FIG. 3. Second AnSGBR device 220 may also, or alternatively, output and/or discharge the partially treated slurry (e.g., that does not include dissolved oxygen, nitrates, nitrites, and/or other non-metals and/or metalloids) to the third AnSGBR device 220 (e.g., AnSGBR device 220-C). Third AnSGBR device 220 may correspond to a third stage of a contaminated water treatment operation that treats a first portion of the contaminants within the partially treated contaminated water. For example, third AnSGBR device 220 may, in a manner similar to that described above with respect to FIG. 3, partially treat some or all of the contaminants (e.g., non-metals, metals, and/or metalloids) within the contaminated water. Additionally, or alternatively, third AnSGBR device 220 may treat the partially treated contaminated water to selectively remove and/or reduce the first portion of contaminants, such as certain excess chemical oxygen demand or biochemical oxygen demand compounds, within the contaminated water. Such treatment may, for example, include performing reactions to remove and/or reduce organic oxygen demanding compounds such as excess carbon source from AnSGBR devices 220-A or 220-B. Third AnSGBR device 220 may also, or alternatively, output and/or discharge the partially treated slurry (e.g., that does not include dissolved oxygen, nitrates, nitrites, and/or other non-metals and/or metalloids, or oxygen demanding compounds) to the aeration device 701. Aeration device 701 may correspond to a treatment stage that adds oxygen as dissolved oxygen to the treated water. Aeration device 701 may comprise an aeration basin with blowers, a venturi type device, or any other type of device which will add dissolved oxygen to the effluent from the anoxic/anaerobic AnSGBR devices. Aeration device 701 may also, or alternatively output partially treated water to chemical reactor device 702. Chemical reaction device 702 may comprise a basin with a mixer, an inline mixer, a static mixer, or any other device that allows a chemical salt to be mixed with and reacted with the water. The chemical salt may comprise ferric chloride, aluminum sulfate, ferric sulfate, or any other chemical that may be used to removal certain remaining contaminants such as phosphorous or selenite by adsorption or precipitation. The chemical addition may also or alternatively comprise certain organosulfide compounds used for metals removal such as Nalco Nalmet or GE Betz Metclear chemicals that can react with metals or metalloids that may remain in the AnSGBR device 220 effluent such as mercury. Chemical reaction device 702 may also, or alternatively output partially treated water to a filtration device 703. Filtration device 703 may comprise any filtration device capable of removing the solids in the effluent from chemical reaction device 702.

Filtration system 702 may correspond to the first stage of the contaminated water treatment operation and may perform a filtration operation on the partially treated slurry in a manner similar to that described with respect to FIG. 3 when filtration system corresponds to filtration system 230 and may perform a filtration operation in a manner similar to that described with respect to FIG. 3. Filtration system 703 may also, or alternatively, output any excess biological solids, reduced contaminant precipitates, chemical precipitants, and other suspended solids as waste solids for disposal (e.g., in a landfill, etc.) and/or recovery (e.g., for reuse in an industrial process, recycling, etc.).

Treatment system 700 is described with respect to FIG. 7 as including multiple stages for explanatory purposes. In practice, treatment system 700 may include two or more stages using two or more AnSGBR devices 220, aeration devices 701, chemical reaction devices 702, filtration systems 703 comprising of system 230, and/or filtration system 510 or other filtration system. Additionally, or alternatively, treatment system 700 may enable the first biological diversity and/or concentration to be managed to a greater degree of precision (e.g., within a smaller range of ORP values) than treatment system 300 of FIG. 3 (e.g., associated with a single stage contaminated water treatment operation) to ensure the first contaminants are treated by the first AnSGBR device 220. Similarly, treatment system 700 may enable the second biological diversity and/or concentration to be managed to a greater degree of precision (e.g., at an appropriate range of ORP values) than treatment system 300 (FIG. 3) to ensure the second contaminants are treated by the second AnSGBR device 220. Thus, treatment system 700 may ensure that a greater quantity of contaminants are reduced and/or removed from the contaminated water relative to treatment system 300 that performs the single stage water treatment operation. Additionally, or alternatively, the multi-stage contaminated water treatment operation may enable contaminants to be reduced and/or removed from a greater quantity of water relative to the single stage operation (e.g., based on a higher flow rate or throughput relative to the single stage operation). Additionally, or alternatively, treatment system 700 may ensure that the treated water has sufficient dissolved oxygen prior to being output. Additionally, or alternatively, treatment system 700 may ensure maximized metals, non-metals, or metals removal by the use of chemical salts or organosulfides with such chemical reaction devices 702 and filtration devices 703.

Additionally, or alternatively, treatment system 700 may correspond to a hybrid treatment system 700 that includes a combination of one or more AnSGBR devices 220 and one or more conventional reactors associated with attached growth technology.

Additionally, or alternatively, under certain conditions, first AnSGBR device 220 may receive contaminated water directly from a source without being pretreated by pretreatment system 210 when the quality of the influent contaminated water is suitable for bacterial and/or microbial growth in the first AnSGBR device 220.

Systems and/or methods, described herein, may enable contaminated water to be treated using an anaerobic suspended growth water treatment system to reduce and/or remove the contaminants from the contaminated water. The systems and/or methods may also, or alternatively, enable an AnSGBR device, associated with the anaerobic suspended growth water treatment system, to reduce the contaminants within contaminated water more efficiently than the previously described attached growth technology. Additionally, or alternatively, the systems and/or methods may enable the AnSGBR device to treat contaminated water using facultative heterotrophic bacteria and/or obligate anaerobic heterotrophic bacteria (e.g., sulfate reducing bacteria) or some combination thereof that are suspended in contaminated water and capable of reducing non-metals, and/or metals and/or metalloids that may occur in one or more oxidation states.

The systems and/or methods may enable the AnSGBR device to support a greater bacterial population and/or concentration than that which is supported by a conventional reactor associated with attached growth technology. The greater bacterial population and/or concentration may enable the AnSGBR device to treat a greater quantity of contaminated water, within a time period, than the conventional reactor (e.g., based on a higher flow rate, throughput, etc.). The greater bacterial diversity and/or concentration may also, or alternatively, enable the AnSGBR device to treat the contaminated water based on a detention time within the AnSGBR device that is less than a detention time associated with the conventional reactor. Incorporating a submerged filtration operation in the AnSGBR device may produce a higher quality treated effluent than produced by conventional attached growth technology.

The systems and/or methods may also, or alternatively, enable the AnSGBR device to use the higher bacterial population and/or concentration to treat all of the contaminants in a single AnSGBR device and/or single-stage operation, which may be less expensive and easier to operate than the conventional reactor based on the attached growth technology which uses two or more stages and/or conventional reactors to treat the contaminated water. Additionally, or alternatively, the systems and/or methods may enable the AnSGBR device to occupy less space and/or volume than one or more conventional reactors which may result in the AnSGBR device having smaller land requirements than the conventional technology.

The foregoing description provides illustration and description, but is not intended to be exhaustive or to limit the implementations to the precise form disclosed. Modifications and variations are possible in light of the above teachings or may be acquired from practice of the implementations.

While certain reactions are individually described as occurring within AnSGBR device 220 in FIGS. 3, 5, and 6, the reactions may be performed in parallel and the order in which the reactions occur may be modified in other implementations.

It will be apparent that systems and/or methods, as described above, may be implemented in many different forms of hardware, equipment, devices, systems, mechanical interconnections, and/or electrical interconnections in the implementations illustrated in the figures. The actual hardware, equipment, devices, systems, mechanical interconnections, and/or electrical interconnections used to implement these systems and methods is not limiting of the implementations—it being understood that hardware, equipment, devices, systems, mechanical interconnections, and/or electrical interconnections can be designed to implement the systems and methods based on the description herein. Further, certain portions, described above, may be implemented as a component that performs one or more functions.

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" and "an" are intended to include one or more items and may be used interchangeably with "one" or "more." Where only one item is intended, the term "one" or similar language is used. Further, the phrase "based on" is intended to mean "based, at least in part, on" unless explicitly stated otherwise.

What is claimed is:

1. An anaerobic treatment system to treat contaminated water, the treatment system comprising:
   a single-chamber reactor providing an anaerobic environment, the single chamber reactor comprising:
      a slurry of contaminated water comprising one or more contaminants selected from the group consisting of a perchlorate, a metal, or a metalloid; and
      a mixed bacterial culture suspended within the slurry and not attached to a physical substrate associated with attached growth technology, wherein the mixed bacterial culture comprises:
    metal-reducing bacteria and
    a mixing system that mixes the slurry to maintain the mixed bacterial culture and/or other solids within the reactor in suspension; and
a means for adding separately to the single chamber reactor an organic material selected from the group consisting of a low molecular weight organic acid, and a simple carbohydrate wherein the organic material acts as an electron donor for the mixed bacterial culture and thus enables the mixed bacterial culture to react with the contaminated water to biologically and/or chemically reduce and precipitate the contaminants in the contaminated water;
wherein biological and/or chemical reduction and precipitation of the contaminants occurs in the anaerobic environment in the single-chamber reactor and
a filtration device that:
    receives the treated slurry, and
    recovers the mixed bacterial culture from the treated slurry and returns at least a portion of the recovered mixed bacterial culture to the reactor.

2. The system of claim 1 wherein the filtration device:
receives the treated slurry;
removes, from the treated slurry, the mixed bacterial culture and the precipitated contaminants including precipitated metals and metalloids if present; and
outputs treated water from which the precipitated contaminants have been removed.

3. The system of claim 2 further comprising a chemical reaction device.

4. The system of claim 3 wherein the chemical reaction device mixes a chemical salt with the treated water.

5. The system of claim 4 wherein the chemical salt is selected from the group consisting of ferric chloride, aluminum sulfate, and ferric sulfate.

6. The system of claim 4 wherein the chemical salt is an organosulfide compound.

7. The system of claim 1 wherein at least one of the contaminants is selected from the group consisting of mercury, lead, copper, and selenium.

8. A method for treating contaminated water in an anaerobic environment, the method comprising:
providing an anaerobic treatment system comprising:
    a single-chamber reactor housing an anaerobic environment, the single-chamber reactor comprising:
        a slurry of contaminated water comprising contaminants wherein at least one of the contaminants is a perchlorate, a metal, or a metalloid, and
        a mixed bacterial culture suspended within the slurry and not attached to a physical substrate associated with attached growth technology, wherein the mixed bacterial culture comprises:
            metal-reducing bacteria that biologically and/or chemically reduce one or more of the contaminants,
delivering the contaminated water to the anaerobic environment in the single-chamber reactor;
mixing the slurry under anaerobic conditions to keep the mixed bacterial culture in suspension;
providing separately to the single chamber reactor an organic material selected from the group consisting of a low molecular weight organic acid, and a simple carbohydrate, wherein the organic material acts as an electron donor to enable the mixed bacterial culture to react with the contaminated water to biologically and/or chemically reduce and precipitate the contaminants in the contaminated water, while maintaining the anaerobic environment; and
producing a treated slurry comprising the organic material, the mixed bacterial culture, and the contaminated water from which the contaminants have been precipitated, reduced or removed;
delivering the treated slurry to a filtration device that recovers at least a portion of the mixed bacterial culture from the treated slurry; and returning at least a portion of the recovered mixed bacterial culture to the reactor.

9. The method of claim 8 wherein the filtration device:
removes, from the treated slurry, the mixed bacterial culture and the precipitated metals and metalloids if present; and
outputs, treated water from which the biologically and/or chemically reduced contaminants have been removed.

10. The method of claim 9 further comprising a chemical reaction device.

11. The method of claim 10 wherein the chemical reaction device mixes a chemical salt with the treated water.

12. The method of claim 11 wherein the chemical salt is selected from the group consisting of ferric chloride, aluminum sulfate, and ferric sulfate.

13. The method of claim 11 wherein the chemical salt is an organosulfide compound.

14. The method of claim 8 wherein at least one of the contaminants is selected from the group consisting of mercury, lead, copper, and selenium.

15. The method of claim 8 further comprising increasing the rate of the biological and chemical reactions in the reactor by increasing the rate of flow of the recovered mixed bacterial culture back to the reactor.

* * * * *